United States Patent
Peissner et al.

(10) Patent No.: US 9,321,348 B2
(45) Date of Patent: Apr. 26, 2016

(54) MULTIFUNCTION INPUT DEVICE

(75) Inventors: Maria Peissner, Stuttgart (DE);
Barbara Metternich-Heider,
Filderstadt (DE); Peter Roessger,
Aichtal (DE); Olaf Preissner, Stuttgart
(DE); Sandra Kretzler, Filderstadt
(DE); Ulrike Johannsen, Stuttgart (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1036 days.

(21) Appl. No.: 11/710,602

(22) Filed: Feb. 23, 2007

(65) Prior Publication Data

US 2008/0030361 A1    Feb. 7, 2008

(30) Foreign Application Priority Data

Feb. 24, 2006   (EP) ..................................... 06003851

(51) Int. Cl.
| | |
|---|---|
| G08B 7/00 | (2006.01) |
| B60K 37/06 | (2006.01) |
| B60K 35/00 | (2006.01) |
| G05G 1/02 | (2006.01) |
| G05G 1/08 | (2006.01) |
| G05G 9/047 | (2006.01) |

(52) U.S. Cl.
CPC ................. B60K 37/06 (2013.01); B60K 35/00 (2013.01); G05G 1/02 (2013.01); G05G 1/08 (2013.01); G05G 9/047 (2013.01); G05G 9/04788 (2013.01); B60K 2350/1024 (2013.01); B60K 2350/1028 (2013.01); G05G 2009/04781 (2013.01)

(58) Field of Classification Search
CPC .......................................................... G08B 7/00
USPC ........... 341/20, 35; 340/461, 425.5, 678, 525, 340/691.5
See application file for complete search history.

(56) References Cited

U.S. PATENT DOCUMENTS

| | | | |
|---|---|---|---|
| 5,530,455 A |  | 6/1996 | Gillick et al. |
| 6,429,542 B1 | * | 8/2002 | Furuya ................. H01H 9/0235 307/10.1 |
| 6,459,169 B1 | * | 10/2002 | Onodera ................ G05G 9/047 180/315 |
| 6,522,321 B1 |  | 2/2003 | Chen et al. |
| 6,525,714 B1 |  | 2/2003 | Varga et al. |

(Continued)

FOREIGN PATENT DOCUMENTS

| | | |
|---|---|---|
| DE | 19951379 A1 | 5/2001 |
| DE | 100 12 753 A1 | 6/2001 |

(Continued)

OTHER PUBLICATIONS

Japanese Office Action issued in Japanese Patent Application No. 2007-29720, dated Mar. 18, 2013 (8 pages); with English translation.

(Continued)

*Primary Examiner* — Amine Benlagsir
(74) *Attorney, Agent, or Firm* — Alleman Hall McCoy Russell & Tuttle LLP

(57) ABSTRACT

A multifunction input device may be used to operate in-vehicle systems. The multifunction input device includes a main part having a touch surface and a rotating element. The rotating element rotates around the main part. The rotating element includes a touch surface that may select and activate programs, files, and options.

18 Claims, 8 Drawing Sheets

(56) References Cited

U.S. PATENT DOCUMENTS

| | | | | |
|---|---|---|---|---|
| 6,744,374 | B1* | 6/2004 | Kuenzner | B60H 1/00985 200/312 |
| 6,903,652 | B2* | 6/2005 | Noguchi | B60R 11/02 340/425.5 |
| 7,038,667 | B1* | 5/2006 | Vassallo | G06F 3/016 345/156 |
| 7,310,084 | B2* | 12/2007 | Shitanaka | H01H 25/04 200/5 A |
| 7,327,348 | B2* | 2/2008 | Goldenberg | G05G 1/08 318/568.11 |
| 7,361,854 | B2* | 4/2008 | Basche | G06F 3/0362 200/18 |
| 7,436,398 | B2* | 10/2008 | Yuasa | B60K 37/06 200/5 A |
| 2002/0003081 | A1* | 1/2002 | Kawase | H01H 25/065 200/4 |
| 2004/0032395 | A1* | 2/2004 | Goldenberg | G05G 1/08 345/156 |
| 2004/0131498 | A1* | 7/2004 | Kuutti | G08B 21/182 359/16 |
| 2004/0132498 | A1* | 7/2004 | Clabunde et al. | 455/566 |
| 2006/0000969 | A1* | 1/2006 | Sano | G01D 5/04 250/231.13 |

FOREIGN PATENT DOCUMENTS

| | | |
|---|---|---|
| DE | 10105177 A1 | 8/2002 |
| DE | 103 46 112 A1 | 4/2005 |
| DE | 10 2004 006605 A1 | 9/2005 |
| DE | 10 2004 007293 A1 | 9/2005 |
| DE | 102004006605 A1 * | 9/2005 |
| EP | 1 343 113 A2 | 9/2003 |
| EP | 1 369 768 A2 | 12/2003 |
| EP | 1 369 768 A3 | 7/2004 |
| EP | 1 343 113 A3 | 11/2004 |
| JP | 2000149721 A | 5/2000 |
| JP | 2003168346 A | 6/2003 |
| JP | 2007127840 | 4/2004 |
| JP | 2004359103 A | 12/2004 |
| WO | WO 03/036611 A1 | 5/2003 |
| WO | WO 2005/024540 A2 | 3/2005 |
| WO | WO 2005/024540 A3 | 3/2005 |
| WO | WO 2005/077701 A1 | 8/2005 |

OTHER PUBLICATIONS

European Patent Office, Office Action Issued in European Patent Application No. 10013018.6, Apr. 30, 2015, Netherlands, 5 pages.

* cited by examiner

MULTIFUNCTION INPUT DEVICE

PRIORITY CLAIM

This application claims the benefit of priority from European Patent Application No. 06003851.0 filed on Feb. 24, 2006, which is incorporated by reference.

BACKGROUND OF THE INVENTION

1. Technical Field

This invention relates to a vehicle, and more particularly, to a multifunction input device for operating interactive systems of the vehicle.

2. Related Art

Vehicles may include systems that require user interaction. Each system may include a separate operating device. Positioning and operation of these devices may require differing amounts of attention from a user, which could become dangerous when the vehicle is in motion. Therefore, there is a need for a multifunction input device that interfaces with interactive vehicle systems.

SUMMARY

A multifunction input device may include a main part and a rotating element. Some main parts include a touch surface and have a center part. The rotating element may be rotated around the main part and may include a rotating element touch surface used to generate a user command.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The device may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
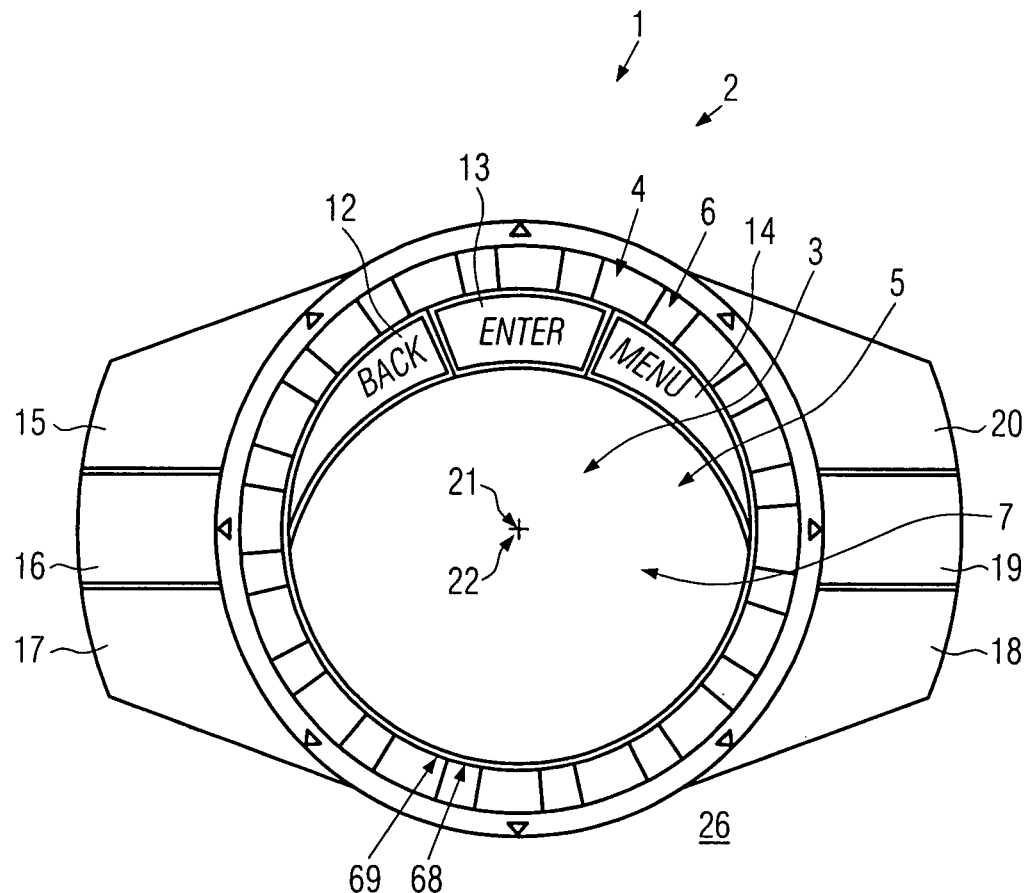
FIG. 1 is a top view of a multifunction input device.

FIG. 1 is a top view of a multifunction input device 1. The input device 1 may be used to operate one or more interactive systems used to transport persons or things, such as a vehicle. The multifunction input device 1 may be located in any area of the vehicle in which a driver or operator may access. In some vehicles, the multifunction input device may be located on a central panel between a driver's seat and a front passenger's seat. This may allow the driver to rest his or her hand on the multifunction input device 1 to control one or more interactive systems. The multifunction input device 1 may communicate with a climate control system, an air-conditioning system, a navigation system, an on-board computer, a communication system, a mobile telephone system, an entertainment system, an audio system, a power window system, and/or other vehicle systems.

The multifunction input device 1 may communicate with some systems through one or more wired or wireless protocols. The wired or wireless protocols may comprise J1850VPW, J1850PWM, ISO, ISO9141-2, ISO14230, CAN, high speed CAN, MOST, LIN, IDB-1394, IDB-C, D2B, TTCAN, TTP, Bluetooth, serial protocol transmissions, and/or parallel protocol transmissions.

The multifunction input device 1 of FIG. 1 includes a selection unit 2 that may be used by a driver or operator to make a selection through many types of environments that represent programs, files, and options by means of icons, menus and dialog boxes on one or more screens. A user may select and activate one or more options by scrolling through options, choosing an option, and/or executing an option.

The selection unit 2 may overlie or may be supported by a base 26. The selection unit 2 may include a main part 3 and a rotating element 4 that may be rotated through an axis passing through to the stationary main part 3. Each of the main part 3 and the rotating element 4 may include a surface 5 or 6, respectively, designed or modified to recognize the location of a touch on its surface. They may include sensing lines that determine the location of a touch by matching vertical or horizontal contacts. Alternatively, the surfaces may comprise electrically charged surfaces and sensors that detect the level of electrical disruption to pin point contact. Other alternative systems use optical or infrared sources (e.g., light emitting diodes) and sensors to create a grid. An interruption may pin point contact on a surface.

In FIG. 1, the touch surfaces 5 and 6 may be accessible during use of the multifunction input device 1. The rotating element touch surface 6 may be rotated relative to a central axis passing through the main part touch surface 5.

Figure 2:
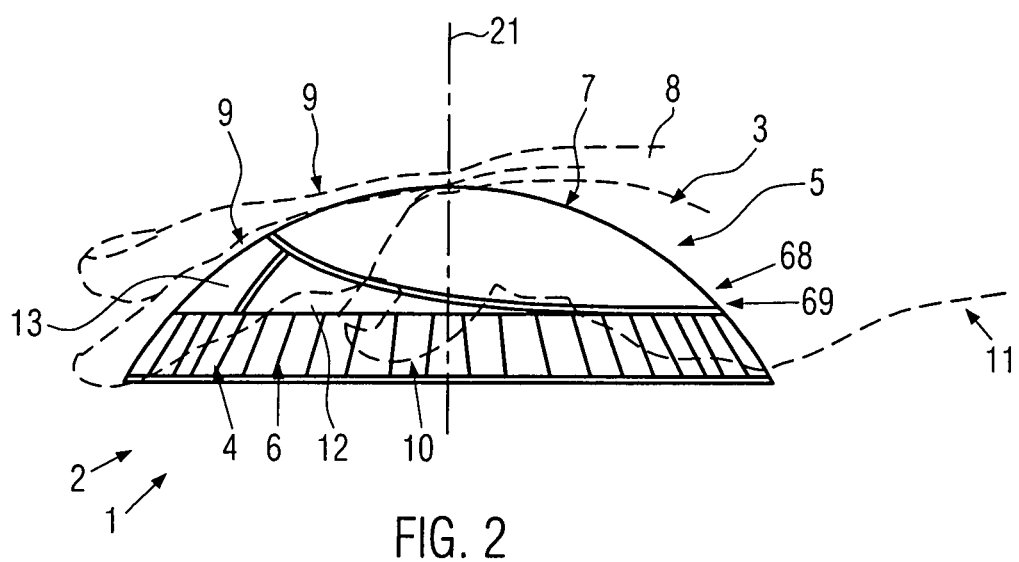
FIG. 2 is a side view of the multifunction input device of FIG. 1.

The main part 3 may include a hand rest 7 on which a user's hand 8 may rest while operating the multifunction input device 1. As shown in FIG. 2, this arrangement may support the user's hand while controlling the multifunction input device 1. Finger 9, thumb 10, and an associated palm or arm 11 may be supported on hand rest 7. The convex surface may allow a user to operate the multifunction input device 1 in a relaxed manner. The rotating element touch surface 6 may provide an operating area of a finger, such as a finger 9 or thumb 10. The rotating element 4 may be rotated, while allowing a finger to remain in contact with the rotating element touch surface 6. The rotation may be translated by a controller into a vertical, horizontal, or other directional signals that provide movement on a screen.

The hand rest 7 may comprise some or all of the main part 3. A user may rest his or her hand on substantially all of the convex part of the touch surface 5. Alternatively, a user may rest his or her hand on a portion of the main part 3. The main part 3 may comprise one or more buttons or other selection device to initiate pre-programmed actions.

Figure 3:
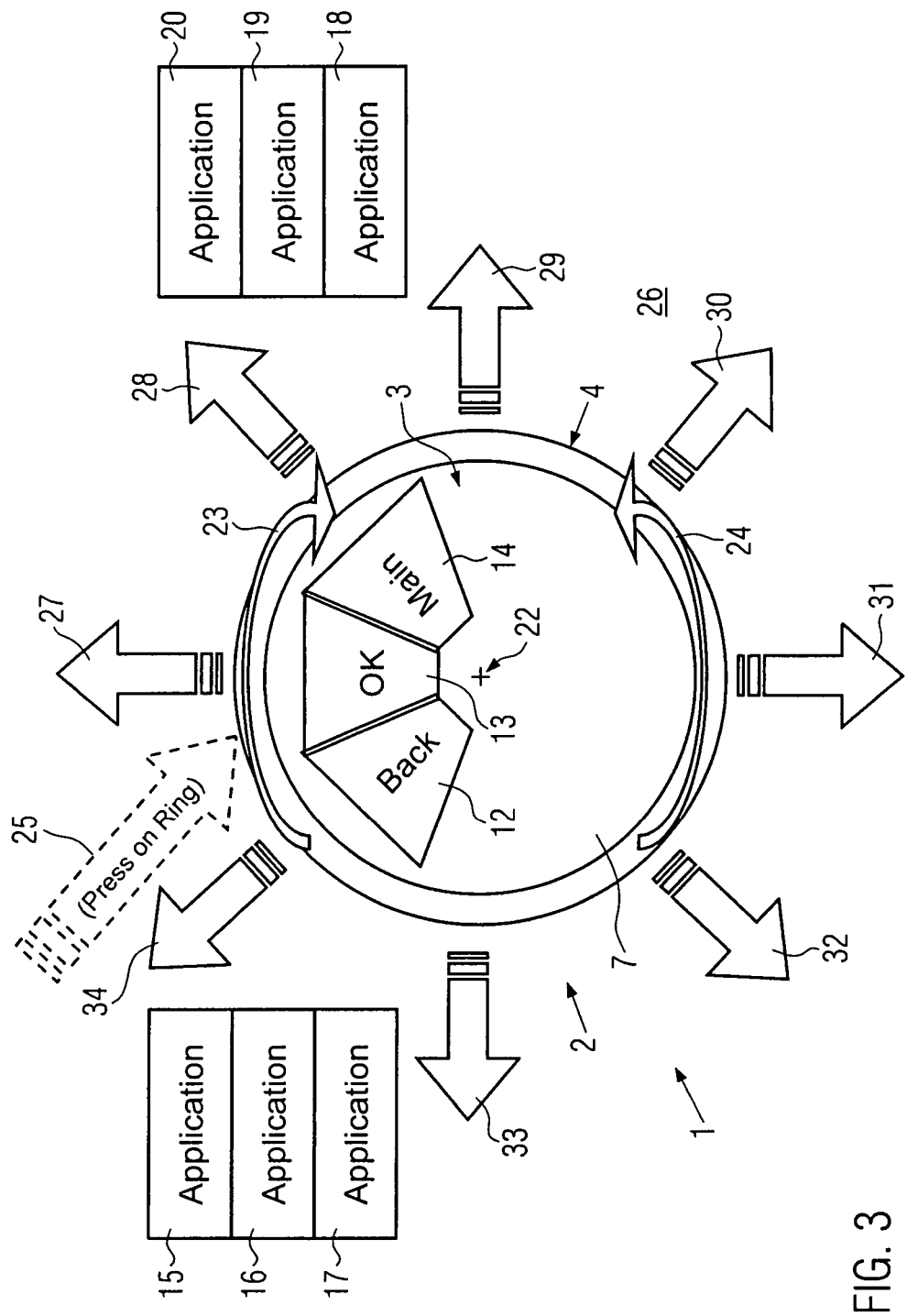
FIG. 3 illustrates some functions of the multifunction input device of FIGS. 1 and 2.

In FIG. 1, the main part 3 comprises three buttons 12, 13, and 14 that may be arranged adjacent to the hand rest 7 and may be adjacent to one another. On some multifunction input devices 1, the buttons 12, 13, and 14 may be positioned between the hand rest 7 and the rotating element 4. Buttons 12-14 may be programmed or configured to generate signals associated with various software applications. In FIG. 3, the button 12 may be associated with a BACK function, the button 13 may be associated with an ENTER or OKAY function, and the button 14 may be associated with a MENU function. Other combinations of button functions and/or button arrangements may be utilized in other systems.

At least one button may be arranged in an area of the main part 3 where at least one finger, such as the finger 9 or 10 of the hand 8 illustrated in FIG. 2, may be positioned to press, activate, or otherwise select the button. On some multifunction input devices, all three of the buttons 12, 13, and 14 may be arranged in an area that may be covered by the fingers 9 or 10. Therefore, the buttons as well as the rotating element 4 may be conveniently operated with a slight movement of the associated finger 9 or 10.

The rotating element 4 may have a substantially ring or annulus like shape. These shapes may provide for a comfortable touch surface for operating the rotating element 4. The rotating element 4 may circumscribe the main part 3, such that the main part 3 may serve as a center part, and the rotating element 4 may be rotated around an axis passing through the main part 3.

At least one other button may be arranged near or close to the rotating element 4. As shown in FIG. 1, six additional buttons 15-20 may partially surround the rotating element 4. These buttons may be programmed with additional functionality, such as switching between different interactive systems controlled by the multifunction input device 1 or operating any number of functions, options, or applications associated with the interactive systems. Also, the buttons are not limited to partially surrounding the rotating element 4. They may be arranged in different positions in varying sizes near the rotation element 4.

The main part touch surface 5 may have a general dome shape or hemisphere like shape in some systems. The rotating element touch surface 6 may have a shape that generally conforms to the shape of the main part touch surface 5.

The concave outer surface of the main part 3 may allow for comfortable support and ergonomic orientation. The shape may correspond to a relaxed position, pose, or posture of the hand. In some systems, other geometric shapes are used, such as a main part 3 with a substantially flatter shape.

The main part 3 may have a middle or a central axis 21 and the rotating element 4 may have a rotation axis 22. The middle or central axis 21 and the rotation axis 22 may be substantially identical or coincident. In some systems the central axis 21 and rotation axis 22 may be substantially parallel to each other. For some multifunction input devices, if the main part touch surface 5 shape is not symmetric, the central axis may be offset and substantially parallel to the rotation axis 22. By having substantially parallel or coincident axes, a hand may comfortably and accurately rotate the rotating element 4 relative to the main part 3. The multifunction input device 1 may be simply constructed and may be easily operated.

FIG. 3 illustrates some functionality of the selection unit 2. The rotating element 4 may be bi-directionally rotated 360° or more in either direction, as shown by the arrows 23 and 24. Alternatively, the rotating element 4 may be limited to a predetermined degree of rotation in one or both directions.

Furthermore, the rotating element 4 may be movable with respect to the main part 3 in a press button manner as indicated by arrow 25, allowing for an integrated functionality. The press button movement may be a transverse or perpendicular shift movement, such as a movement along the rotational axis 22 of the rotating element 4 or transverse to the base 26. Alternatively, the press button movement may be a pivoting movement in which one may depress a portion of the rotating element 4 in a direction generally not parallel to the rotational axis 22. Combinations of transverse and pivoting movements may be utilized. This may provide an input functionality in addition to selections made through the rotation of the rotating element 4. For example, one may use the press button option of the rotating element 4 to input an ENTER or OKAY function. However, any one of the buttons associated with the multifunction input device 1, such as buttons 12-20, may be used for the ENTER or OKAY function.

The main part 3 and the rotating element 4 may move together with respect to the base 26. A combined movement may provide an input functionality, such as further selection capabilities, in addition to selections made through the rotation of the rotating element 4. This additional movement may be in at least one direction. The main part 3 and the rotating element 4 may move together in eight directions relative to the base 26, as shown by arrows 27-34 in FIG. 3. The main part 3 and the rotating element 4 may move together in other directions. Any of the above mentioned movements in a respective direction may be used to scroll, select, execute programs, files, options, or functions associated with remote in vehicle systems.

Figure 4:
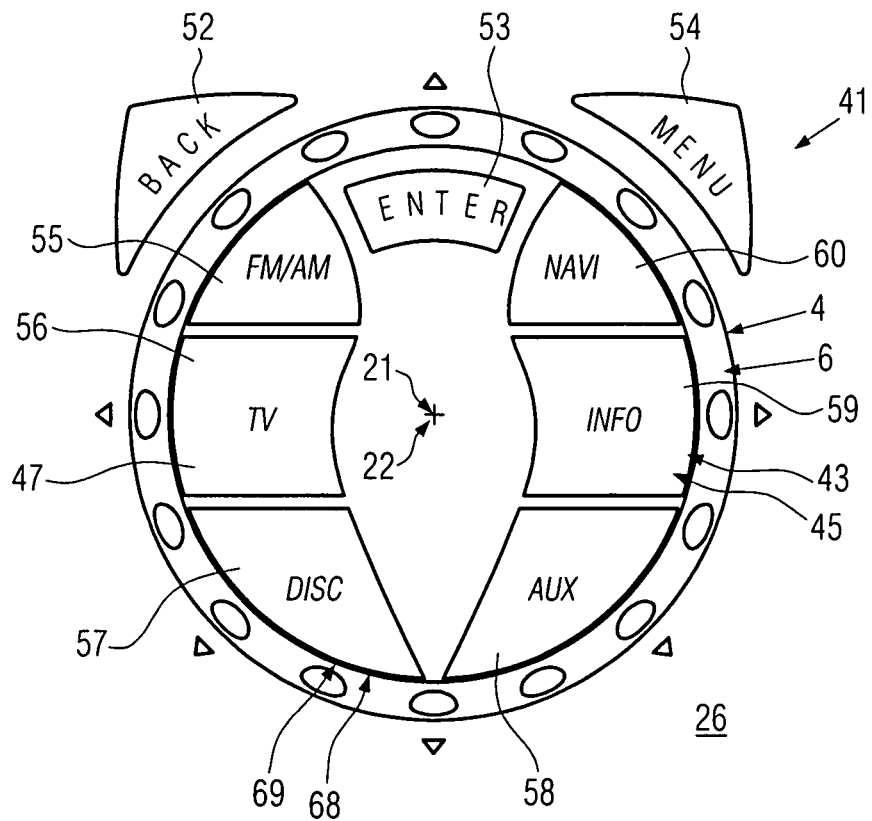
FIG. 4 is a top view of an alternate multifunction input device.
Figure 5:
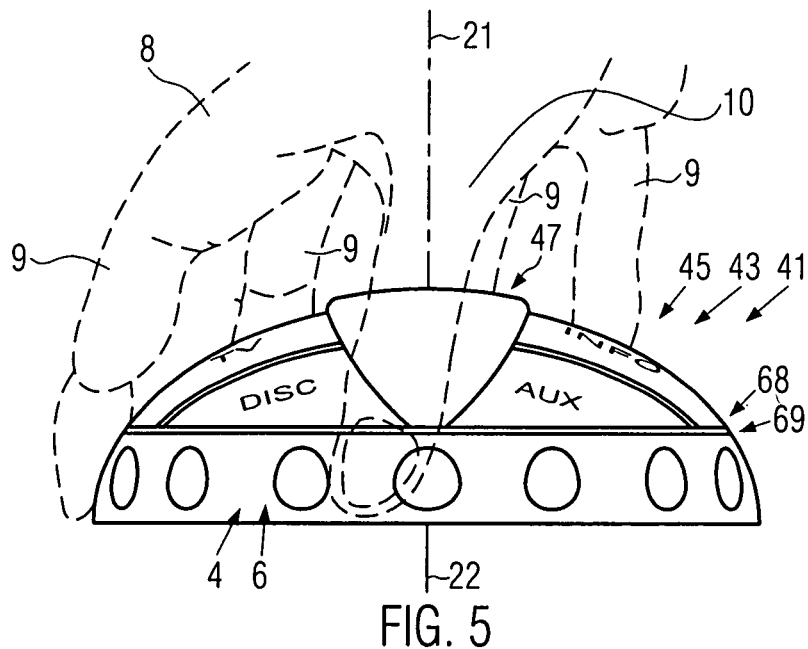
FIG. 5 is a side view of the multifunction input device of FIG. 4.

FIGS. 4 and 5 illustrate an alternate multifunction input device 41. The multifunction input device 41 has a main part 43 with a stepped main part touch surface 45 and a rotating element touch surface 6. The rotating element touch surface 6 may have grooves, convex or concave dimples, or other patterns that increase the surface. Other grooves, convex or concave dimples, or alternative finger grips may be spaced apart substantially equal in distance. The main part 43 may have a hand rest 47 that projects outwardly from the remaining upper surface of the main part 43, as shown in FIG. 5.

The main part 43 may comprise multiple buttons 53, 55, 56, 57, 58, 59, and 60. The button 53 may be surrounded by the hand rest 47, as shown in FIG. 4. The remaining buttons 55, 56, 57, 58, 59, and 60 may be arranged adjacent to the hand rest 47. For example, they may be arranged between the hand rest 47 and the rotating element 4. The buttons may be arranged in a generally symmetric manner about a central plane. Buttons 55, 56, and 57 may be arranged on one side of the main part 43 and buttons 58, 59, and 60, may be arranged on the other side of the main part 43. The buttons may be a unitary part of the main part touch surface 45. Other buttons, such as buttons 52 and 54, may be arranged near or close to the rotating element 4 of the multifunction input device 41.

The buttons may select and activate applications, options, or functions of one or more in-vehicle systems wirelessly and may be configured to transmit signals that activate various software applications. In FIG. 4, button 55 may be associated with a remote FM/AM radio, button 56 may be associated with a remote TV, button 57 may be associated with a remote compact disc player, button 58 may be associated with a auxiliary power system, button 59 may be associated with a remote information system, and button 60 may be associated with a remote navigation system. Other associations may be designated by a user, original equipment manufacturer, and/or after market supplier. In FIG. 4, button 52 may be associated with a BACK function and button 54 may be associated with a MENU function.

Surrounding button 53 by the hand rest 47 may prevent or substantially reduce the button from being accidentally pressed. Button 53 may be used for a special function, such as a function used in connection with the selections made by other buttons. The special function may be an ENTER or OKAY function. Other combinations, arrangements and button functions are used in alternative applications.

The multifunction input device 41 may include all of the features of the multifunction input device 1 discussed above. In FIG. 5, it may also be possible to operate the multifunction input device 1 or 41 with a hand or palm of a hand distanced from a hand rest, such as hand rest 47.

Figure 6:
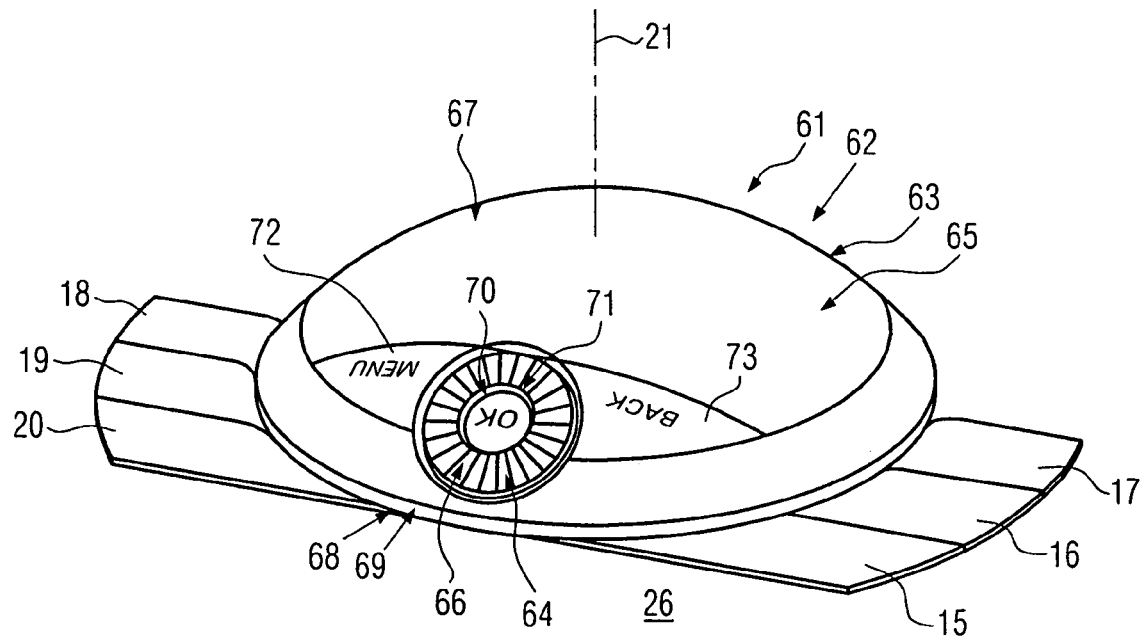
FIG. 6 is a perspective view of a second alternate multifunction input device.
Figure 7:
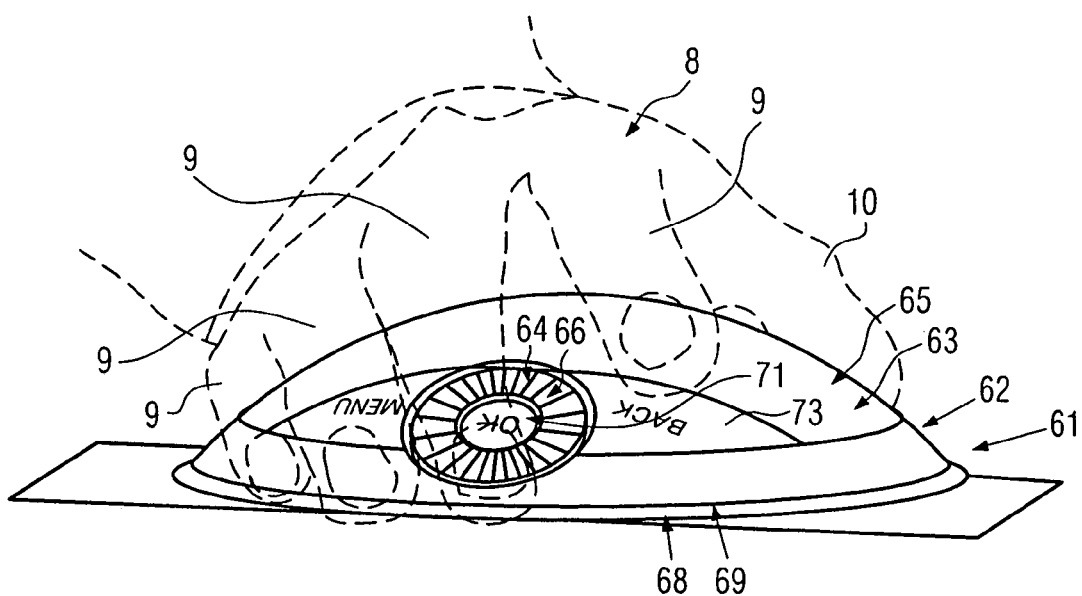
FIG. 7 illustrates the multifunction input device of FIG. 6 in use.

FIGS. 6 and 7 show a second alternate multifunction input device 61. The multifunction input device 61 may include a selection unit 62. The selection unit 62 may rest on or may be supported by a base 26. The selection unit 62 may include a main part 63 having a main part touch surface 65 and a rotating element 64 having a rotating element touch surface 66. The main part 63 may comprise at least one button, such as buttons 72 and 73, shown in FIG. 6. These buttons may be arranged on the same or different sides of the rotating element 64. The button 72 may be associated with a MENU function, and the button 73 may be associated with a BACK function. Additionally, buttons 15-20 may partially surround the main part 63. These buttons may be used for additional functionality, such as switching between systems of the plurality of systems or for selecting and activating functions, options, or applications associated with the plurality of systems. Buttons 15-20 may be arranged in any number of different positions and/or varying sizes near the main part 63 and may be positioned to partially or completely surround the main part 63.

The rotating element 64 may be offset with respect to a middle or center of the main part 63. On some input devices, the rotating element 64 may be arranged close to or near a margin or border 68 of the main part 63, and the rotating element 64 may be partially or entirely surrounded by the main part touch surface 65, as shown in FIGS. 6 and 7. Alternatively, the rotating element 64 may be aligned with an outer edge 69 of the main part 63 or may project from the outer edge 69. A rotational axis of the rotating element 64 may be inclined or at an angle with respect to the middle axis 21 of the main part 63. The inclination may lie between about 0° and about 90° with respect to the middle axis 21.

The rotating element 64 may have a substantially ring like shape and may be rotated around a center part 70. The center part 70 may be used functionally or as an orientation for a driver or operator. The center part 70 may be at least one button. For example, the center part 70 may include a button 71 that generally covers the area surrounded by the ring like shaped rotating element 64. The button 71 may be associated with a special function, such as an ENTER or OKAY function. A hand operating the rotating element 64 may easily find the button 71 by sensory haptic response. In this system a haptic module may generate forces, vibrations, or motions experienced during touch. In such a system, the driver may not need to look at the multifunction input device 61 to find the button 71. A finger, such as the finger 9 or 10, may rotate the rotating element 64 to make a selection and press the button 71 with a small movement. Alternatively, the rotating element 64 may have a substantially disc like shape with no center button. In this configuration, one of the other buttons 15-20 may be associated with an ENTER or OKAY function.

FIG. 7 illustrates the multifunction input device 61 in use. The hand 8 may be in a general resting position intended for operating the multifunction input device 61. With respect to this orientation of the hand 8, the rotating element 64 may be arranged at a front part of the main part 63. The rotating element 64 may be operated by a middle finger of the hand 8 or the adjacent fingers. A combination of fingers may also be used for operation of the rotating element 64.

The rotating element touch surface 66 may correspond to an operating area of the associated finger or fingers. The finger rotating the rotating element 64 may stay in contact with the rotating element touch surface 66 during rotation. The rotating element 64 may be rotated 360° in a clockwise or counterclockwise direction or may be limited to a programmed rotation in one or both directions that may be configured to the system or software it interfaces.

The rotating element touch surface 66 may have a diameter in the range of about 1 cm to about 9 cm. A diameter may be in the range of about 1 cm to about 4 cm and may allow for a comfortable operation of the rotation element 64 as well as allow the rotating element 64 to be precisely positioned for accurate and good operation by a finger.

The main part 63 may have a dome, concave, and/or convex shape. The rotating element 64 may be movable in a press button manner as described above. Also, the main part 63 and rotating element 64 may be movable together in a variety of directions discussed above.

Figure 8:
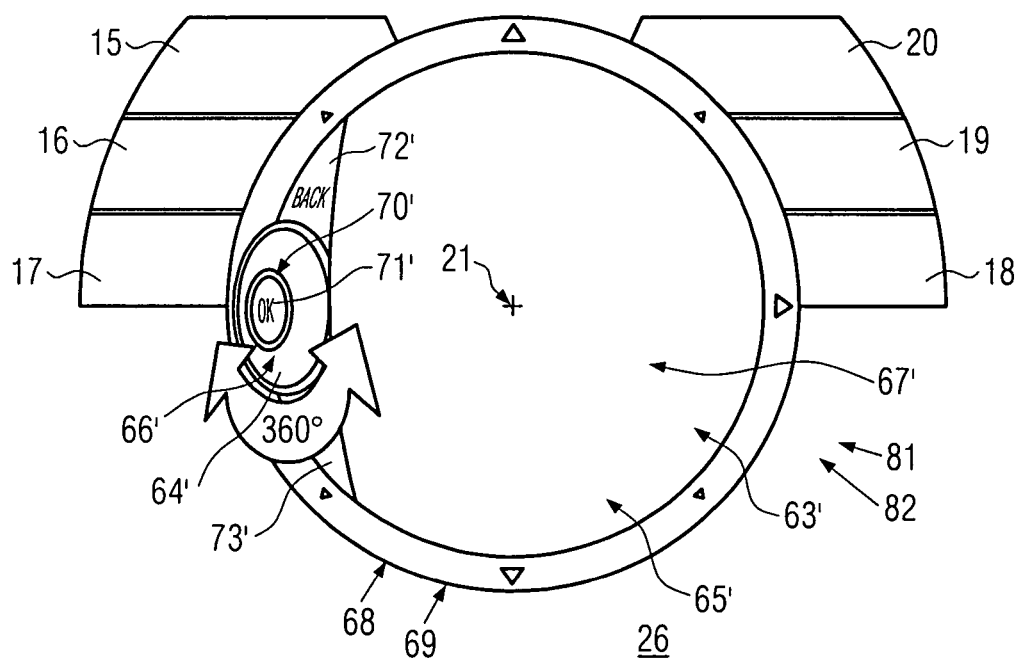
FIG. 8 is a top view of a third alternate multifunction input device.

FIG. 8 shows a third alternate multifunction input device 81. Multifunction input device 81 may be substantially similar to the multifunction input device 61 with an alternate arrangement of the rotating element and its associated buttons. Parts substantially similar to the parts of the multifunction input device 61 except for their position are indicated by similar reference numerals having an apostrophe.

The multifunction input device 81 may include a selection unit 82. The selection unit 82 may overlie or may be supported by a base 26. The selection unit 82 may include a main part 63' having a main part touch surface 65' and a rotating element 64' having a rotating element touch surface 66'. The main part 63' may have buttons 72' and 73'. The rotating element 64' may have a center part 70' as well as a button 71'. The rotating element 64' may be positioned on a side of the main part 63', as shown in FIG. 8. Buttons 71', 72', and 73' may be arranged in an area corresponding to the thumb 10 of the hand 8. Therefore, the thumb 10 may operate the rotation element 64' and the associated buttons.

Figure 9:
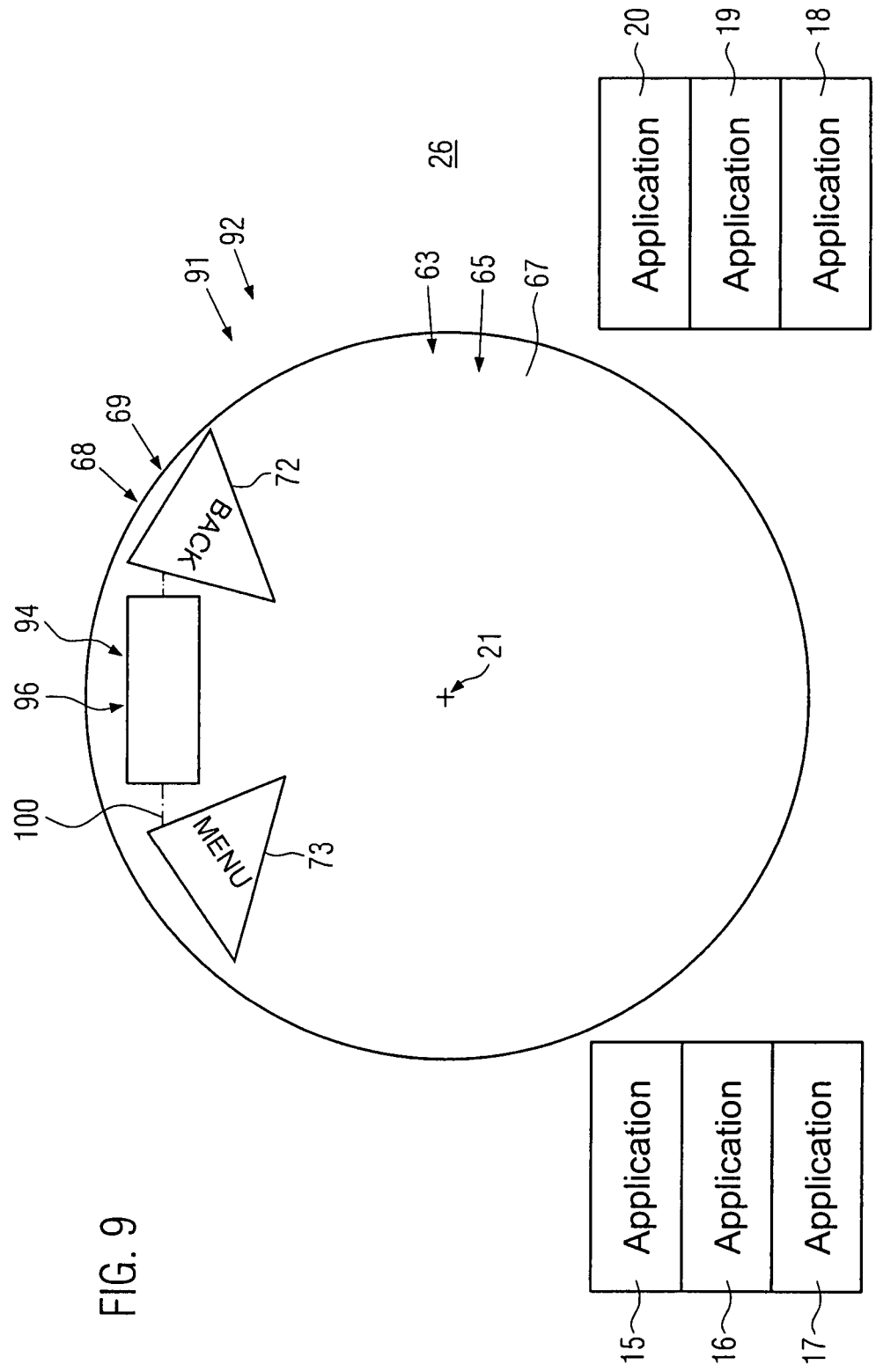
FIG. 9 is a diagram of a fourth alternate multifunction input device.
Figure 10:
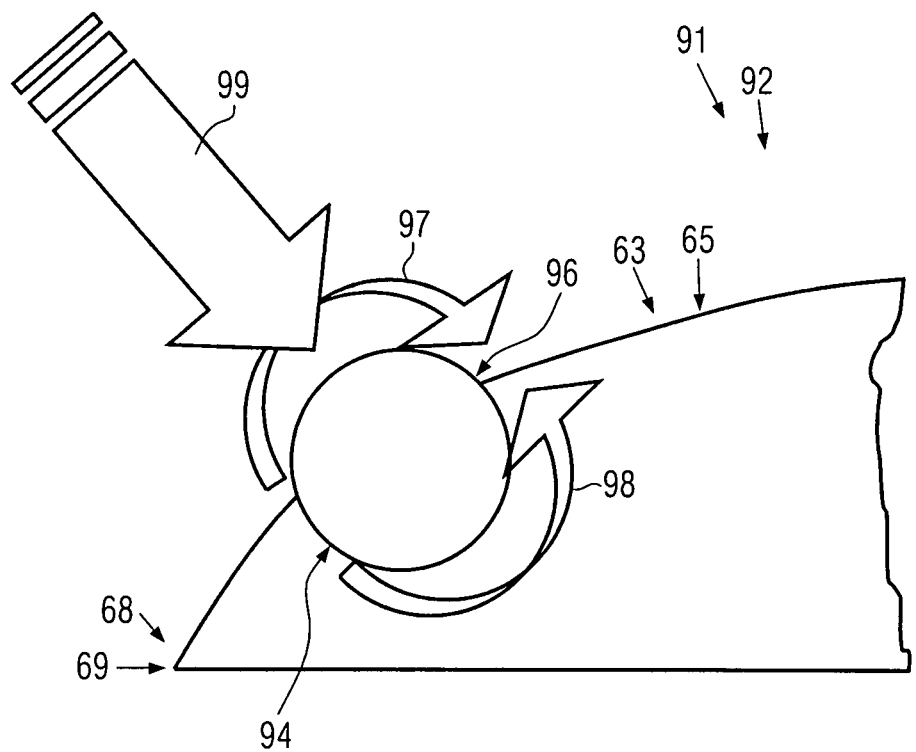
FIG. 10 is a partial sectional view of the multifunction input device of FIG. 9.

FIGS. 9 and 10 shows a fourth alternate multifunction input device 91. The multifunction input device 91 may include a selection unit 92. The selection unit 92 may rest on or may be supported by a base 26. The selection unit 92 may include a main part 63 having a main part touch surface 65 and a rotating element 94 having a circumferential rotating element touch surface 96. The rotating element 94 may have a substantially barrel or cylinder like shape that is rotated with respect to the main part 63.

As shown by arrows 97 and 98 in FIG. 10, the rotation element 94 may rest on two or more rollers that translate the rotation movement into vertical and horizontal movement. Alternatively, the system may be a pair of light sources and a reflective grid to detect motion or may use optical and mechanical means (e.g. a rotating wheel with a cut-out portion) to interpret and indicate motion. In some systems, the rotating element 94 may be programmed or mechanically restricted to a specific degree of rotation in one or more directions. Some rotating elements 94 may be movable in a press button or vertical direction as indicated by the arrow 99. This may provide an input functionality in addition to selections made through the rotation of the rotating element 94. For example, one may use the press button option of the rotation element 94 as an ENTER or OKAY function.

A rotational axis 100, shown in FIG. 9, of the rotating element 94 may be substantially transverse, such as being set crosswise, to the middle axis 21. All the features discussed above in regards to multifunction input devices 1, 41, 61, and 81 may also be utilized for the multifunction input device 91. The different features, arrangements, shapes, sizes, and functionalities described above may be mixed and matched for a plurality of combinations in regards to a multifunction input device of a vehicle.

Figure 11:
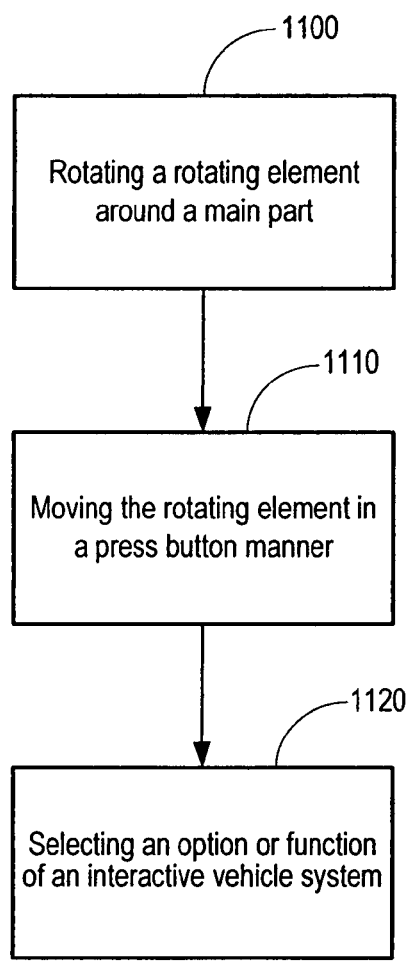
FIG. 11 is a flowchart illustrating a method of operating a multifunction input device.
Figure 12:
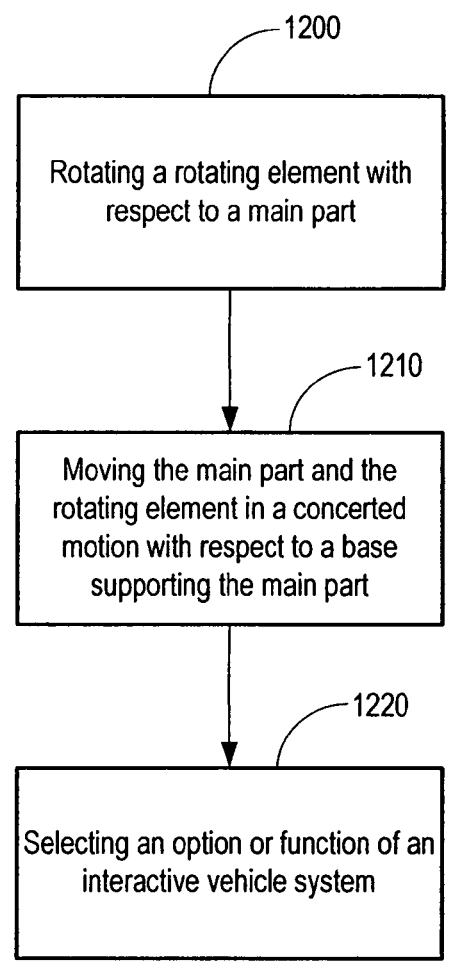
FIG. 12 is a flowchart illustrating an alternate method of operating a multifunction input device.

FIGS. 11 and 12 show methods of operating a multifunction input device, such as multifunction input devices 1, 41, 61, 81, or 91. As shown in FIG. 11, a user may rotate a rotating element around a main part, as in act 1100. The user may rotate the rotating element to navigate through a list of icons, menus, dialog boxes, or one or more screens, options, and/or files of an in-vehicle system. The user may move the rotating element in a press button manner, at act 1110, to view and/or access additional options of an in-vehicle system. Alternatively, the user may move the rotating element in a press button manner to select and/or activate an option. As in act 1120, the user may select an option or function of an in-vehicle system through the use of the multifunction input device.

Alternatively, as shown in FIG. 12, a user may rotate a rotating element with respect to a main part, as in block 1200. The user may rotate the rotating element to navigate through a list of icons, menus, dialog boxes, or one or more screens, options, and/or files of an in-vehicle system. The user may move the main part and the rotating element in a concerted motion with respect to a base supporting the main part, as in block 1210, to view and/or access additional options of an in-vehicle system. Alternatively, the user may move the main part and the rotating element in a concerted motion to select and/or activate an option. As in act 1220, the user may select an option or function of an in-vehicle system through the use of the multifunction input device. Any of the functions discussed above in regards to multifunction input devices 1, 41, 61, 81, or 91 may be mixed and matched to allow a user to perform a variety of methods in operating the multifunction input device and in-vehicle systems.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A multifunction input device that interfaces with interactive vehicle systems comprising:
   a base; and
   a selection unit supported by the base, the selection unit further comprising:
   a stationary main part having a main part touch surface, where the stationary main part comprises a center part, and wherein the stationary main part comprises an immovable hand rest that is immovable in a vertical direction;
   a rotating element having a rotating element touch surface, where the rotating element is operable to be rotated around the stationary main part, and the rotating element is operable to make a selection of an option or function of an interactive vehicle system, wherein the main part touch surface and the rotating element touch surface are configured to recognize location of a touch of a user;
   where the stationary main part and the rotating element are together transversely shiftable with respect to the base, and a combined movement of the stationary main part and the rotating element are configured to provide an input functionality in addition to selections made through a rotation of the rotating element, wherein the rotating element is independently movable with respect to the stationary main part in a press button manner; and
   where the rotating element touch surface corresponds to an operating area of a finger of a resting hand, wherein the rotating element rotates while allowing the finger to remain in contact with the rotating element touch surface, and the rotating element moves in a concerted motion with respect to the base supporting the stationary main part.

2. A multifunction input device of claim 1, where the stationary main part comprises a button.

3. The multifunction input device of claim 1, where the rotating element comprises a substantially ring or disc like shape.

4. The multifunction input device of claim 1, where the main part touch surface has a general dome shape.

5. The multifunction input device of claim 4, where the rotating element touch surface has a shape substantially conforming to the shape of the main part touch surface.

6. The multifunction input device of claim 1, where a rotational axis of the rotating element is substantially coincident to a middle axis of the stationary main part.

7. The multifunction input device of claim 1, where a rotational axis of the rotating element is substantially parallel to a middle axis of the stationary main part and wherein the vertical direction is substantially parallel to the middle axis of the stationary main part and the rotational axis of the rotating element.

8. A multifunction input device that interfaces with an interactive vehicle system, comprising:
   a base;
   a selection unit supported by the base, the selection unit further comprising:
   a stationary main part having a main part touch surface, wherein the stationary main part comprises an immovable hand rest that is immovable in a vertical direction;
   a rotating element having a rotating element touch surface, where the rotating element is operable to be rotated with respect to the stationary main part, and the rotating element is operable to make a selection of an option or function of an interactive vehicle system, wherein the main part touch surface and the rotating part touch surface are configured to recognize location of a touch in its touch surfaces;
   where the stationary main part and the rotating element are together transversely shiftable with respect to the base, and a combined movement of the stationary main part and the rotating part are configured to provide an input functionality in addition to selections made through a rotation of the rotating element; and
   the stationary main part and the rotating element move in a concerted motion transversely with respect to the base supporting the stationary main part and the rotating element, the rotating element is independently movable with respect to the stationary main part in a press button manner; and where the rotating element touch surface corresponds to an operating area of a finger of a resting hand, wherein the rotating element rotates while allowing the finger to remain in contact with the rotating element touch surface.

9. The multifunction input device of claim 8, where the rotating element is movable with respect to the stationary main part in a substantially vertical motion–the substantially vertical motion being motion in the vertical direction.

10. The multifunction input device of claim 8, where the rotating element has a substantially cylinder or barrel like shape.

11. The multifunction input device of claim 8, where the rotating element is arranged near a margin of the stationary main part.

12. The multifunction input device of claim 8, where the rotating element touch surface has a diameter in the range of about 1 cm to about 9 cm.

13. The multifunction input device of claim 8, where the rotating element rotates around a center part, the center part comprising a button.

14. The multifunction input device of claim 8, where the main part touch surface has a convex shape.

15. The multifunction input device of claim 8, where a rotational axis of the rotating element is inclined with respect to a middle axis of the stationary main part.

16. The multifunction input device of claim 15, where the rotational axis is transverse to the middle axis.

17. A method of operating a multifunction input device that interfaces with interactive vehicle systems, comprising:
   selecting by a selection unit supported by a base;
   rotating a rotating element with respect to a stationary main part, where the rotating element comprises a rotating element touch surface and the stationary main part comprises a main part touch surface, where the stationary main part comprises a center part, and wherein the stationary main part comprises an immovable hand rest, the immovable hand rest being immovable in a vertical direction;
   moving the rotating element relative to the stationary main part, where the stationary main part and the rotating element are together transversely shiftable with respect to the base, the base supporting the stationary main part, and where the main part touch surface and the rotating part touch surface are configured to recognize location of a touch in its touch surfaces; and
   selecting an option or function of an interactive vehicle system where the rotating element selects the option or function independently of the main part in a press button manner, and a combined movement of the stationary main part and the rotating element are configured to provide an input functionality in addition to selections made through a rotation of the rotating element,
   where the rotating element touch surface corresponds to an operating area of a finger of a resting hand, wherein the rotating element rotates while allowing the finger to remain in contact with the rotating element touch surface, and the rotating element moves in a concerted motion with respect to the base supporting the stationary main part.

18. The method of claim 17, wherein the vertical direction is parallel to the transverse shiftable movement of the rotating element.

* * * * *